United States Patent
Lester et al.

(10) Patent No.: US 7,784,442 B2
(45) Date of Patent: Aug. 31, 2010

(54) TURBOCHARGED ENGINE CYLINDER HEAD INTERNAL COOLING

(75) Inventors: Dominique T. Lester, Oxford, MI (US); Douglas Ostrowski, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 374 days.

(21) Appl. No.: 11/942,222

(22) Filed: Nov. 19, 2007

(65) Prior Publication Data

US 2009/0126659 A1    May 21, 2009

(51) Int. Cl.
    *F01P 3/14*    (2006.01)
(52) U.S. Cl. .............................. 123/193.5; 123/41.82 R
(58) Field of Classification Search .............. 123/193.5, 123/41.72, 31.75, 41.76, 41.79, 41.82 R
    See application file for complete search history.

(56) References Cited

U.S. PATENT DOCUMENTS 4,018,195 A * 4/1977 Bandrowski, Jr. ........ 123/41.76
4,034,723 A * 7/1977 Hamparian ............... 123/41.76
5,560,331 A * 10/1996 Komatsu et al. ......... 123/193.5

* cited by examiner

*Primary Examiner*—M. McMahon (57) ABSTRACT

An engine cylinder head has an exhaust manifold cast in the cylinder head. A turbocharger with a turbine body is adapted to mount directly to an exhaust outlet mounting face of the exhaust manifold. A dual level water jacket within the cylinder head has separate coolant feeds for upper and lower cooling jackets. The cooling jackets extend above and below the exhaust outlet and are connected inward of the exhaust mounting face to reduce metal temperatures of the mounting face below those of the turbocharger exhaust inlet flange. Separate cores for the upper and lower jackets are connected at coolant inlet and outlet locations at opposite ends. Intermediate core print connectors form controlled flow passages between the upper and lower jackets and exhaust ports in the cylinder head and integrated manifold. The improved cooling in these areas lowers operating temperatures in the cylinder head and obviates the need for a separate exhaust manifold.

8 Claims, 14 Drawing Sheets

TURBOCHARGED ENGINE CYLINDER HEAD INTERNAL COOLING

TECHNICAL FIELD

This invention relates to an engine cylinder head with internal exhaust manifold and dual level cooling passages to minimize heat conduction from a directly attached turbocharger.

BACKGROUND OF THE INVENTION

It is known in the art relating to turbocharged automotive engines to utilize an exhaust manifold between the cylinder head and the turbocharger to minimize the conduction of heat from the exhaust turbine back to the engine cylinder head. However, the separate exhaust manifold occupies additional space in the automobile engine compartment and adds cost to the engine/turbocharger assembly.

SUMMARY OF THE INVENTION

The present invention provides an engine cylinder head with an exhaust manifold integrally cast as part of the cylinder head casting. The turbocharger with its turbine body is mounted directly to an exhaust outlet of the internal exhaust manifold in the cylinder head. A dual level water jacket within the cylinder head is provided with separate coolant feeds for the upper and lower cooling jackets. The cooling jackets extend above and below the exhaust outlet and are connected inward of the exhaust mounting face to reduce metal temperatures of the mounting face below those of the associated turbocharger exhaust inlet flange.

Separate cores for the upper and lower jackets are connected at coolant inlet and outlet locations at opposite ends. Intermediate core print connectors form controlled flow passages between the upper and lower jackets at critical areas near the combustion chambers and exhaust ports in the cylinder head and integrated manifold. The improved cooling in these areas lowers operating temperatures in the cylinder head and obviates the need for a separate exhaust manifold.

These and other features and advantages of the invention will be more fully understood from the following description of certain specific embodiments of the invention taken together with the accompanying drawings.

DESCRIPTION OF AN EXEMPLARY EMBODIMENT

Referring first to FIGS. 1-5 of the drawings in detail, numeral 10 generally indicates an exploded assembly of an engine cylinder head 12 and an engine turbocharger 14. The turbocharger is of generally conventional design adapted for mounting directly to the cylinder head 12. The turbocharger includes a compressor section 16 having a compressor wheel, not shown, driven by a turbine wheel, not shown, carried in a turbine section enclosed by a housing 18 of material including, but not limited to, stainless steel or other suitable material. The housing includes a turbine inlet flange 20 mounted on the engine cylinder head by fasteners, including, but not limited to, threaded studs 22 and nuts 24.

Figure 1:
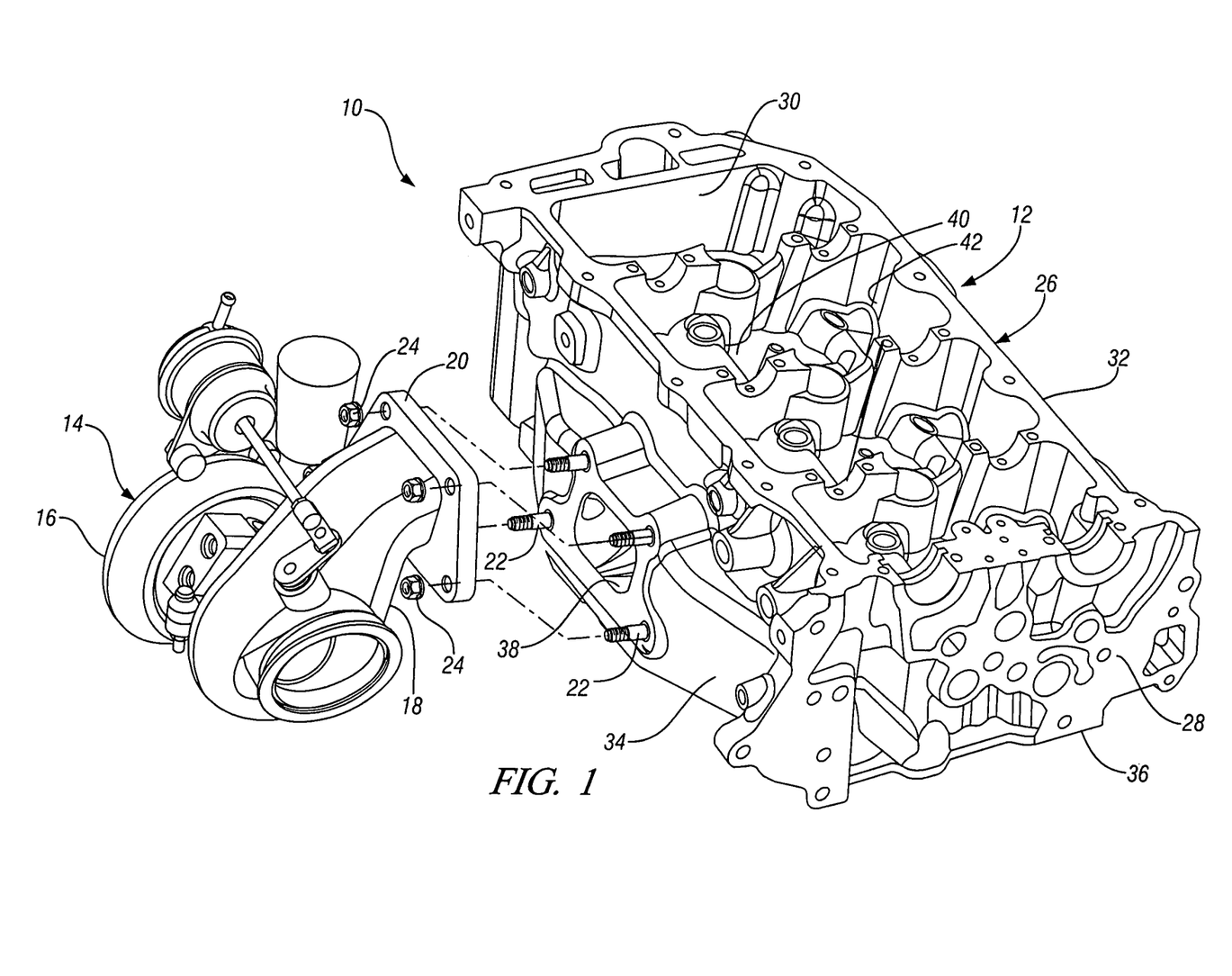
FIG. 1 is an exploded pictorial view angled downward toward the upper right corner of a high output engine cylinder head and direct mounted turbocharger assembly.

The cylinder head 12 is represented in FIG. 1 by a machined casting 26 of suitable material including, but not limited to, aluminum based alloys. Other components of an assembled cylinder head, such as camshaft covers camshaft drive cover, camshafts, drive mechanisms, engine valves and actuating mechanisms have been omitted as they are unnecessary for understanding the invention. A suitable gasket, which may be used between the turbine inlet flange and the cylinder head, is also not shown.

As shown in FIG. 1, the cylinder head casting 26 has four perimeter walls, including a front end wall 28 and a rear end (breather) wall 30 connected longitudinally by left (intake) and right (exhaust) side walls 32, 34, respectively. A bottom (combustion chamber) wall 36 connects the perimeter walls and, when completed as a head assembly, forms a closure for the cylinders of an associated engine cylinder bank, not shown. A lower portion of the right side wall 34 protrudes outward to enclose part of an exhaust manifold 38 enclosed within the cylinder head casting 26. An upper internal wall or spring deck 40 is spaced above the exhaust manifold 38 and forms the bottom of an oil return chamber 42 in which camshafts, valves, springs and valve gear, not shown, may be enclosed by a camshaft cover, not shown.

Figure 2:
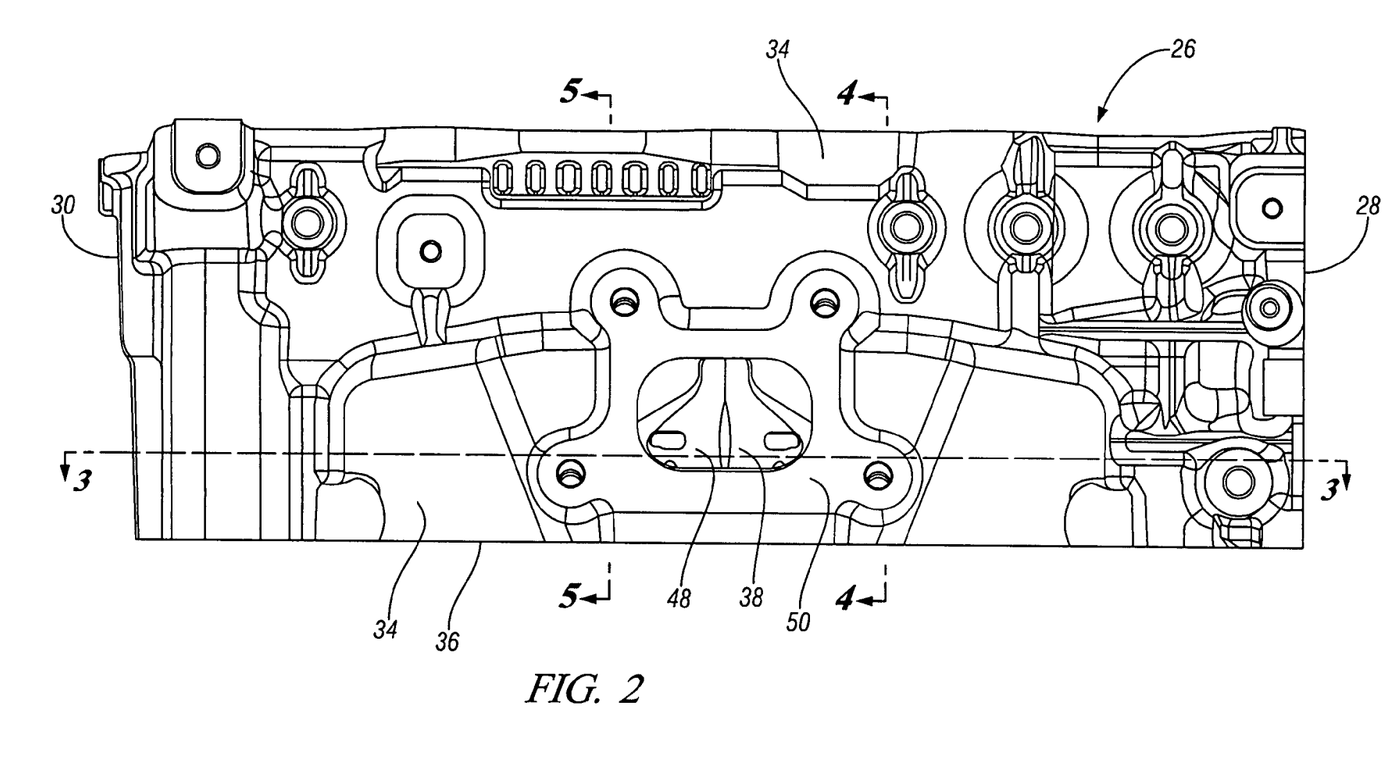
FIG. 2 is a right side elevational view of an engine cylinder head according to the invention.

FIGS. 2 through 5 illustrate internal features of the machined cylinder head casting 26 which form portions of the present invention. FIG. 2 illustrates the right side wall 34 and indicates the locations of cross-sectional views of FIGS. 3-5, through which the internal features are described.

Between the spring deck 40 and the bottom wall 36, the exhaust manifold 38 is enclosed in the right side of the head casting 26. The exhaust manifold 38 includes internal walls 43 defining exhaust gas passages 44 extending from individual exhaust ports 46 in the bottom wall 36 to an exhaust gas outlet 48 in the right side wall. The exhaust outlet 48 opens through a mounting face 50 on the right side wall and adapted for direct mounting of the turbocharger exhaust inlet flange 20 thereon to form the cylinder head turbine assembly 10.

On the left side of the cylinder head casting 26, between the bottom wall 36 and the spring deck 40, internal walls 52 define air intake passages 54 extending from individual intake ports 56 in the bottom wall 36 to inlet openings, not shown, adapted to be connected with the turbocharger compressor 16.

For cooling the exhaust and intake passages 44, 54 within the cylinder head, as well as the lubricating oil in the oil return chamber 42 above the spring deck 40, the cylinder head casting 26 includes a water jacket 58 that extends between the bottom wall 36 and the spring deck 40. However, in order to provide more effective cooling to the internal exhaust manifold passages, including at the turbocharger mounting face 50, the water jacket 58 is divided into a lower coolant jacket 60 and an upper coolant jacket 62, largely separated by a generally horizontal dividing wall 64.

The lower and upper cooling jackets 60, 62 form vertically separated generally longitudinal coolant flow passages 66, 68, extending from adjacent the rear end wall 30 of the cylinder head to adjacent the front end wall 28. The lower cooling jacket 60 is in heat exchange relation with the inside 70 of the bottom (combustion chamber) wall 36 and the lower side 71 of the exhaust manifold 38 in the cylinder head. The upper cooling jacket 62 is in heat exchange relation with the upper side 72 of the exhaust manifold 38 in the cylinder head and with the spring deck 40 below the oil return chamber 42 in the cylinder head above the water jacket 60.

Figure 3:
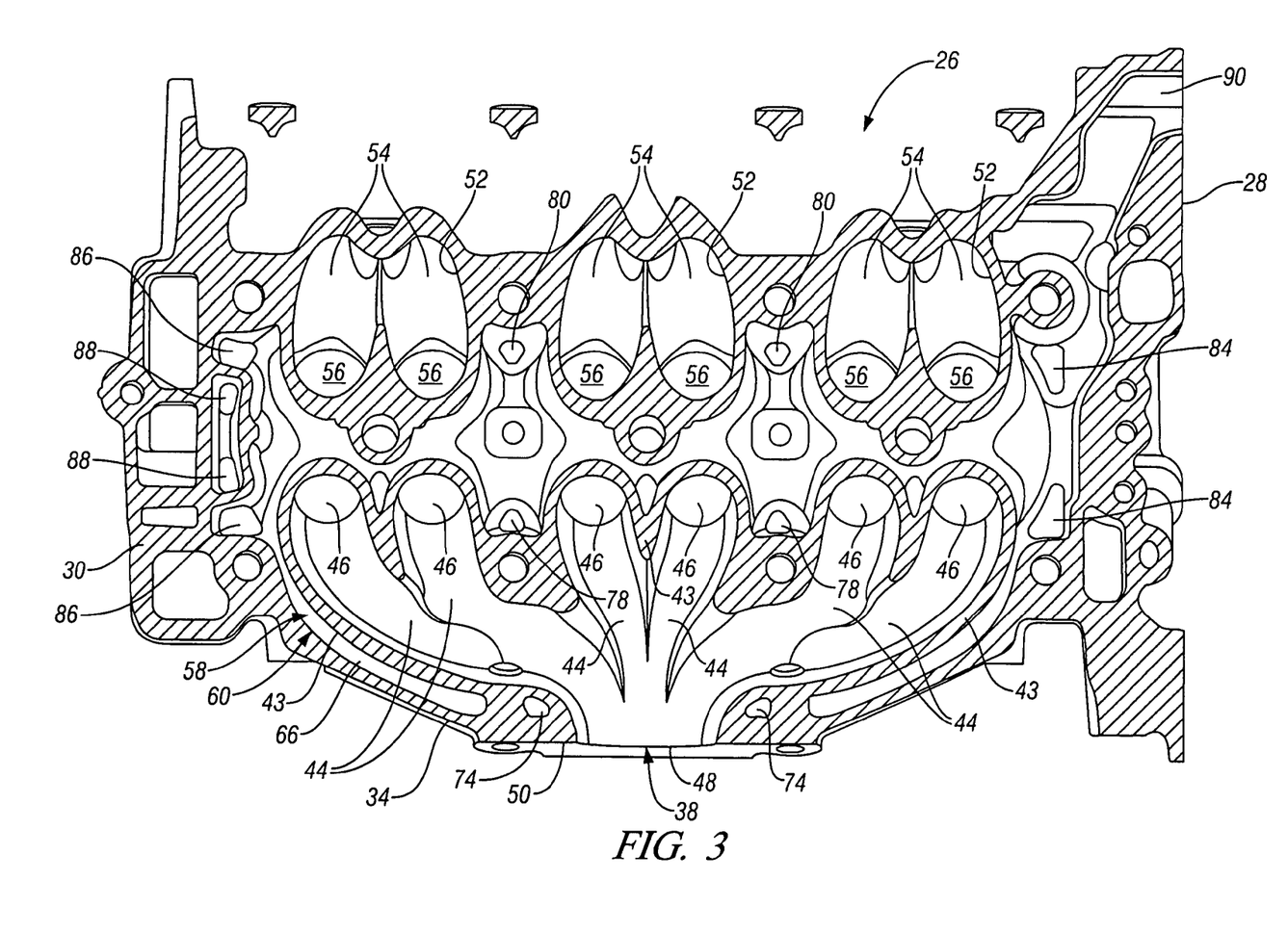
FIG. 3 is a horizontal longitudinal cross-sectional view downward from the line 3-3 of FIG. 2 showing the lower cooling jacket and internal gas passages of the cylinder head.
Figure 4:
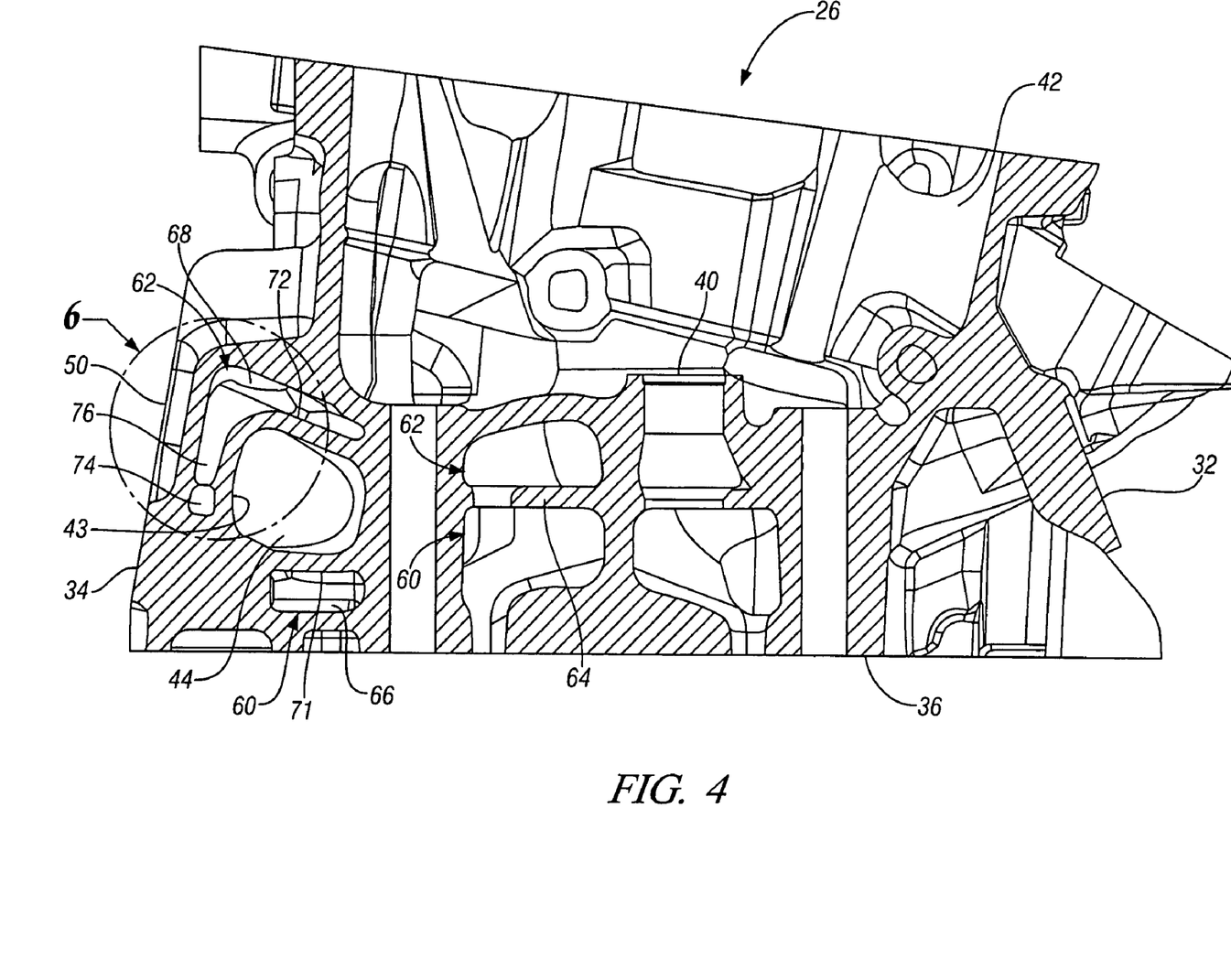
FIG. 4 is a vertical transverse cross-sectional view in the direction of the arrows from the line 4-4 of FIG. 2.
Figure 5:
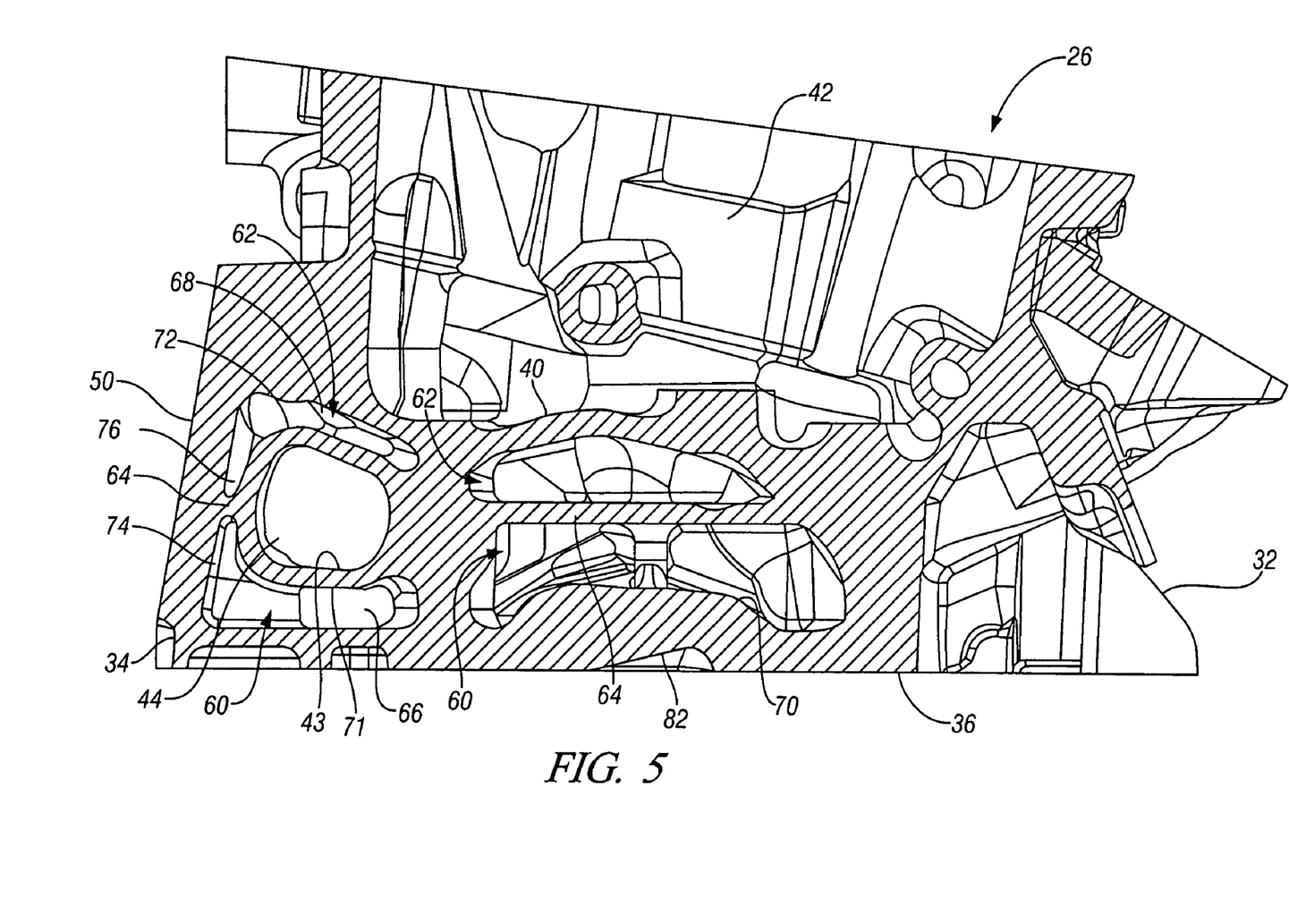
FIG. 5 is a view similar to FIG. 4 from the line 5-5 of FIG. 2.
Figure 6:
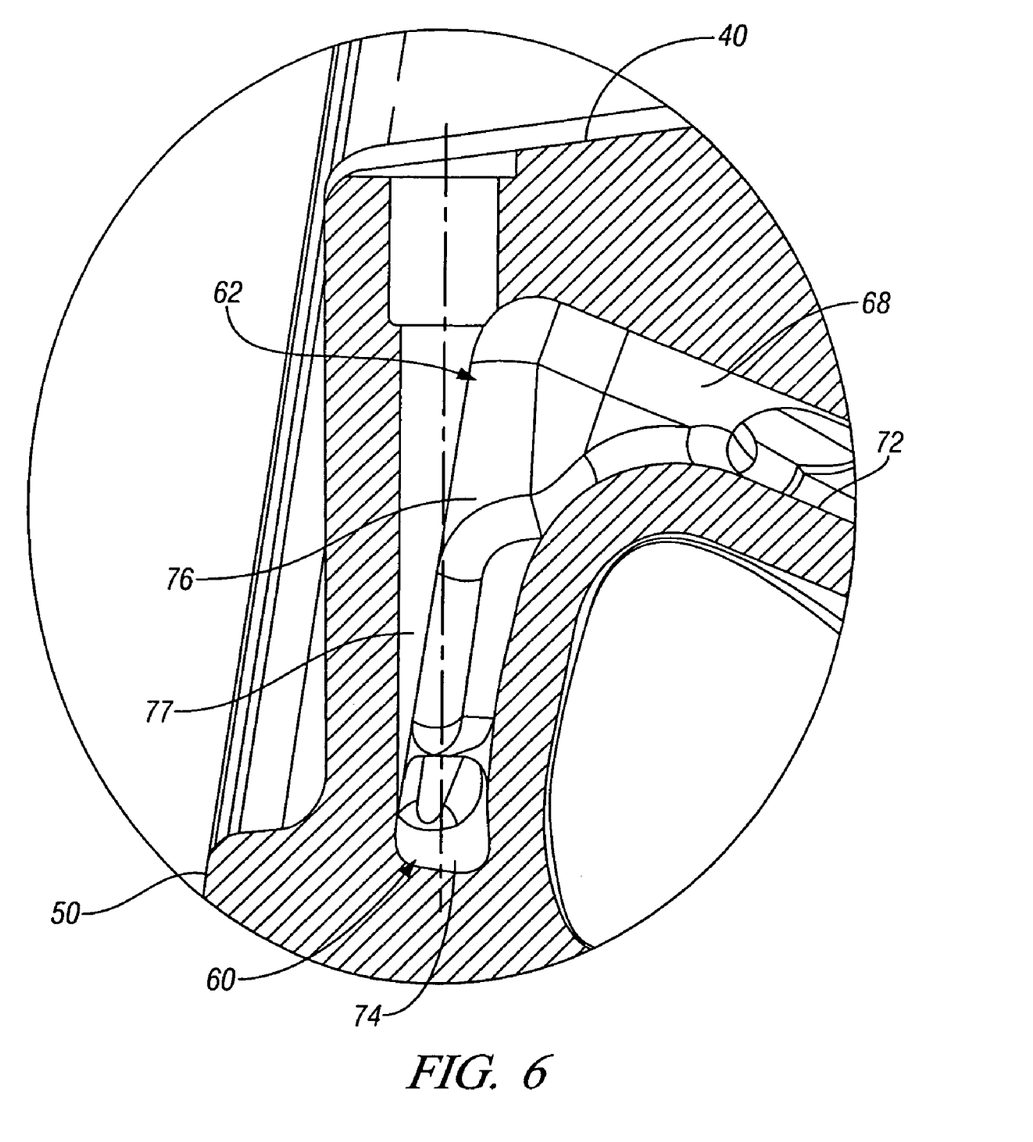
FIG. 6 is an enlarged view of the structure in the circle 6 of FIG. 4.

The generally horizontal cooling flow passages 66, 68 in the lower and upper cooling jackets 60, 62 also include generally vertical portions 74, 76, respectively, which extend along outer edges if the exhaust manifold 38 (see FIGS. 3, 4, 5). The portions 74, 76 are separated by the dividing wall 64 except where they approach the sides of the exhaust outlet 48 near the mounting face 50. FIG. 6 shows an enlarged view of a location in circle 6 of FIG. 4. There the lower and upper passage portions 74, 76 connect with one another through the dividing wall 64, creating a continuous passage 74, 76 around the exhaust outlet 48 and inwardly adjacent the mounting face, as shown by the positions of passage portion 74 in FIG. 3. The continuous passage 74, 76 allows coolant flow around the periphery of the exhaust outlet near the mounting face and provides increased cooling for the mounting face. The increased cooling maintains the aluminum mounting face of the cylinder head at a much lower maximum temperature (below 250° C.) than the maximum temperature reached in the turbine inlet mounting flange when mounted against the mounting face with a high temperature gasket, not shown. Drilled inspection holes 77 may be drilled into the junctures of the vertical passage portions 74, 76 to assure that casting flash is not present partially blocking the passage or to clean it out if necessary.

FIG. 3 illustrates additional vertical passages in the water jacket 58, some extending between the lower and upper cooling jackets 60, 62. Flow restricted passages 78, 80 are formed by core prints joining core portions, to be subsequently discussed, generally between exhaust ports 46 and intake ports 56 of adjacent engine combustion chambers 82 and communicating the lower and upper cooling jackets 60, 62. Other core print passages 84 connect the jackets at the front end wall 28 of the cylinder head.

The rear end wall 30 of the cylinder head includes separate vertical inlet passages adapted to receive coolant from an associated engine block. Outboard passages 86 deliver coolant to the lower coolant jacket while inboard passages 88 carry coolant to the upper coolant jacket, thus allowing allocation of coolant flow between the lower and upper jackets. At the front end of the head, the coolant from both the lower and upper jackets is directed into a common outlet passage 90 for recirculation in the cooling system.

Referring now to FIGS. 7-14, there are shown some of the cores used in casting of the subsequently machined cylinder head casting 26. These may be helpful in more clearly visualizing the lower and upper cooling jackets 60, 62 of the cylinder head water jacket 58 as well as the exhaust manifold gas passages.

Figure 7:
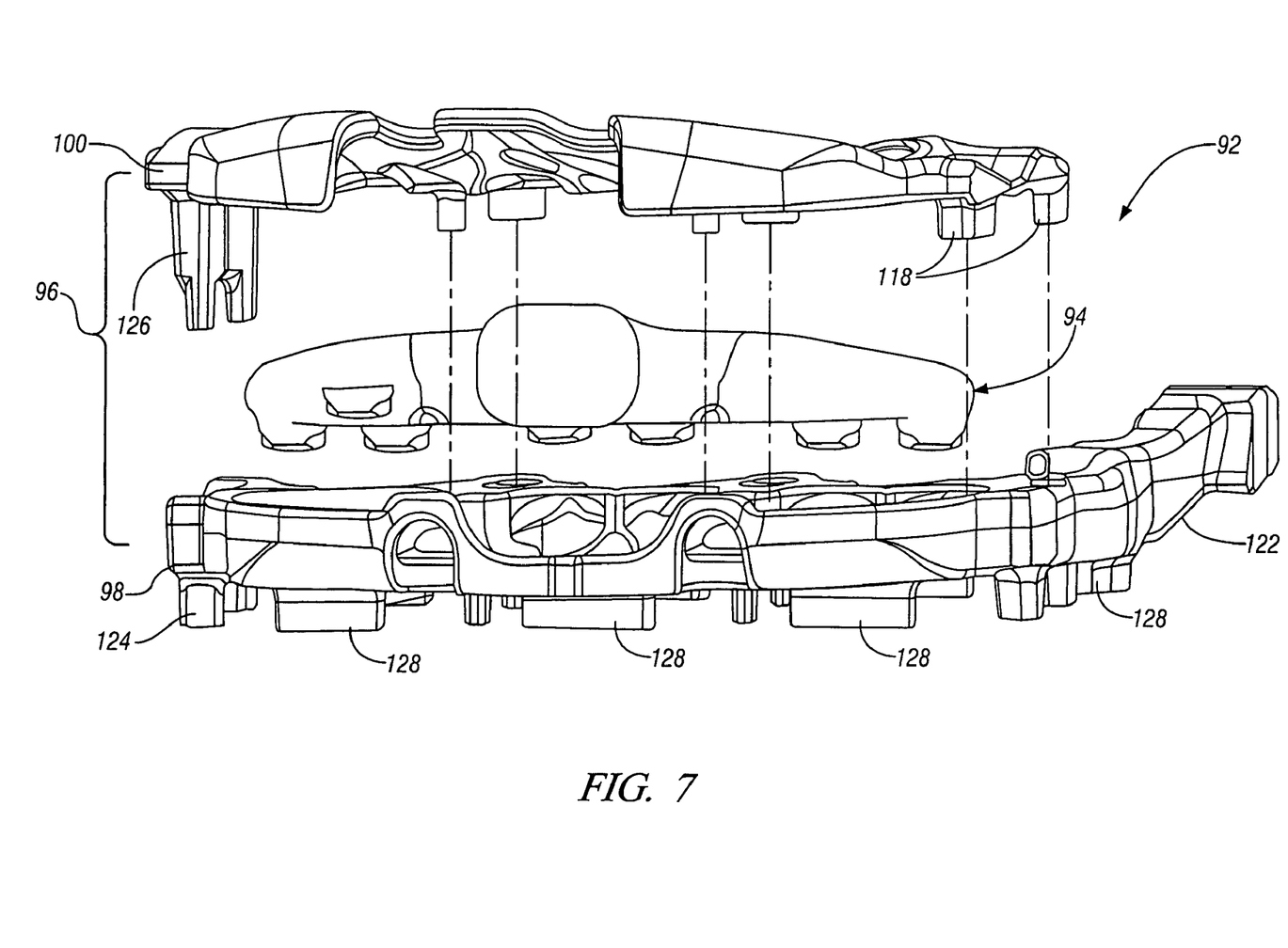
FIG. 7 is an exploded view of a water jacket core assembly including lower and upper jacket cores surrounding an internal exhaust manifold core.
Figure 8:
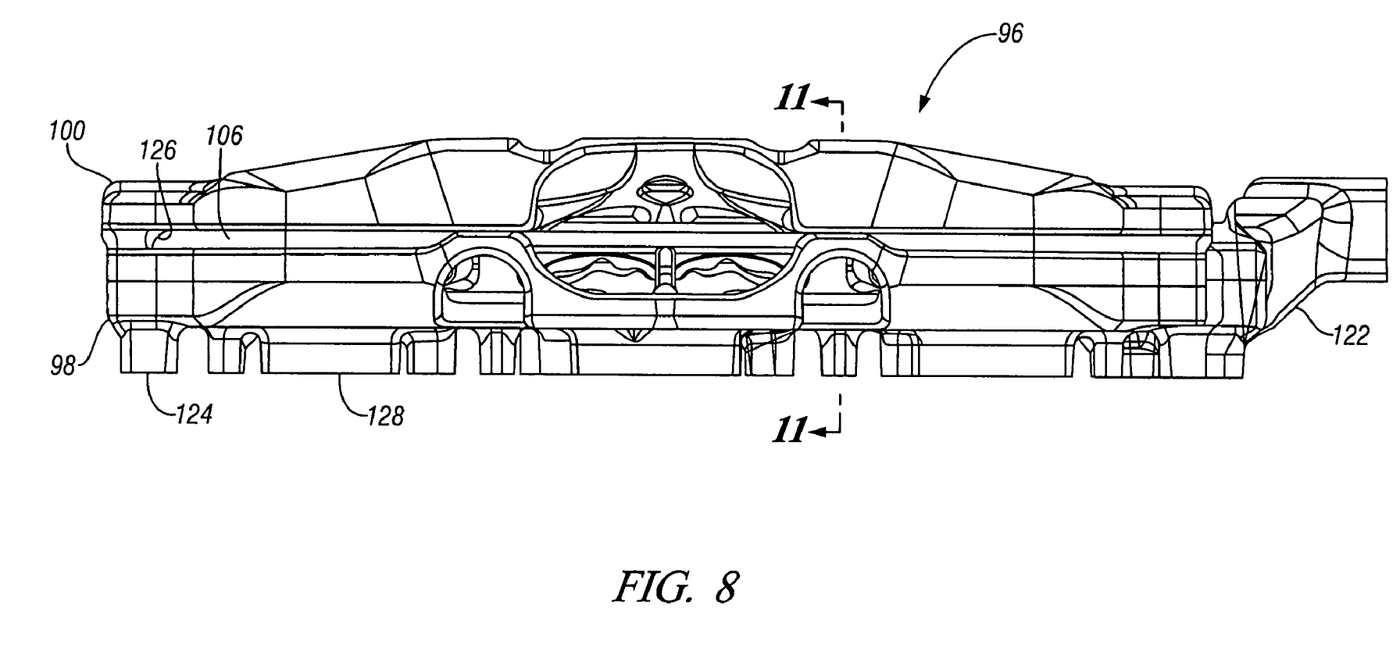
FIG. 8 is a right side view of the water jacket core assembly with the exhaust manifold core omitted.

FIG. 7 illustrates a composite core assembly 92 for use in casting a cylinder head for an engine. Assembly 92 includes an exhaust manifold core 94 installed within a water jacket core assembly 96 including a lower cooling jacket core 98 and an upper cooling jacket core 100 as shown in FIG. 8. When assembled, the composite core is used for forming the cast interior cooling jacket passages surrounding the internal exhaust manifold 38 and the internal shapes of the lower combustion chamber wall (bottom wall 36), the upper spring deck wall 40 and the perimeter walls and air intake passage walls in the lower portion of a cylinder head according to an exemplary embodiment of the present invention.

Figure 10:
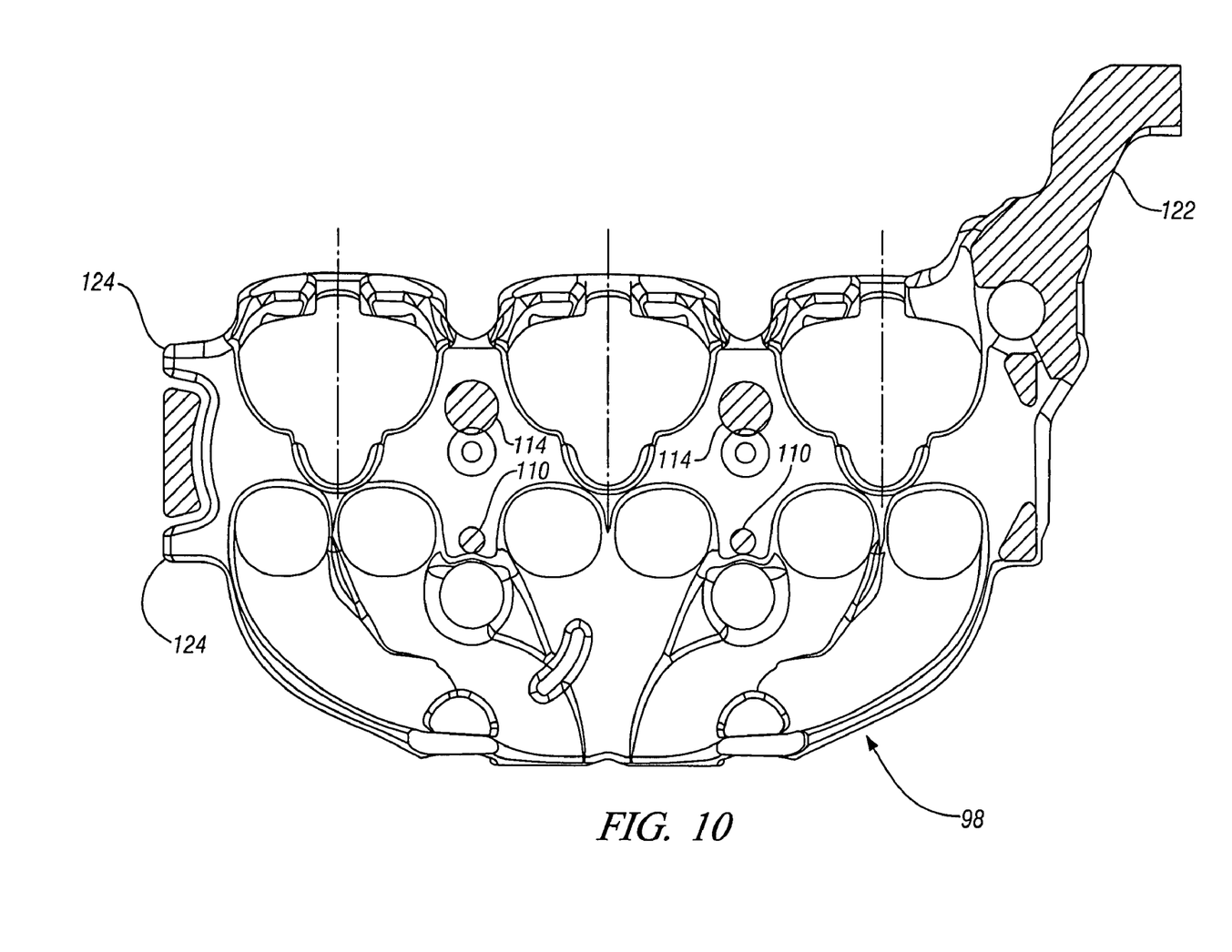
FIG. 10 is a top cross-sectional view of the lower water jacket core looking down from the line 10-10 of FIG. 8.

The lower cooling jacket core 98, shown in FIGS. 8 and 10, extends longitudinally to form the lower walls of the internal exhaust manifold 38 and the inner side 70 of the cylinder head bottom wall 36 and defines the lower cooling passages between them which make up the lower cooling jacket 60.

Figure 9:
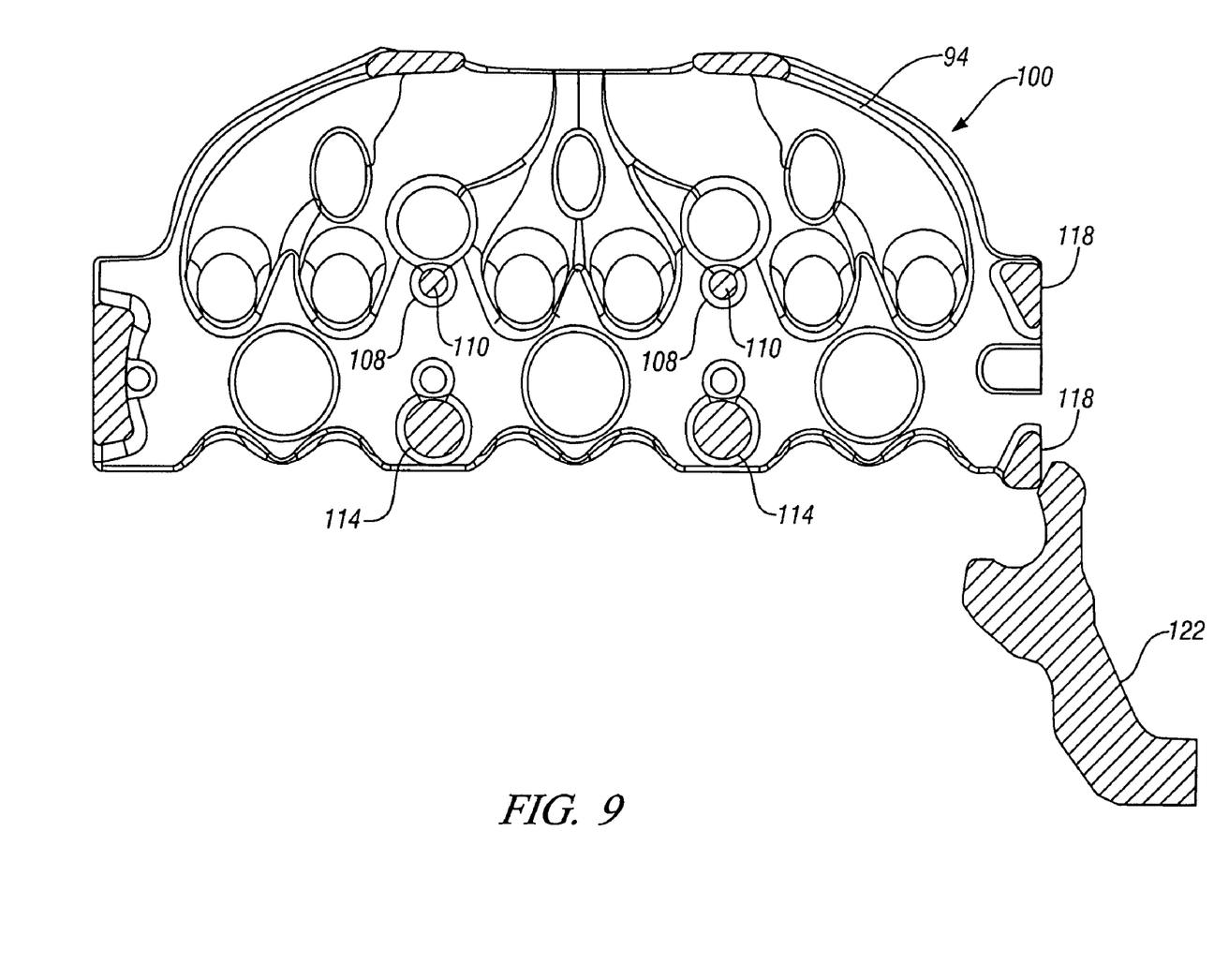
FIG. 9 is a bottom cross-sectional view of the upper water jacket core looking up from the line 9-9 of FIG. 8.

The upper cooling jacket core 100, shown in FIGS. 8 and 9 extends longitudinally to form the upper walls of the exhaust manifold 38 and the lower side of the spring deck wall 40 and defines the upper cooling passages between them which make up the upper cooling jacket 62.

Figure 11:
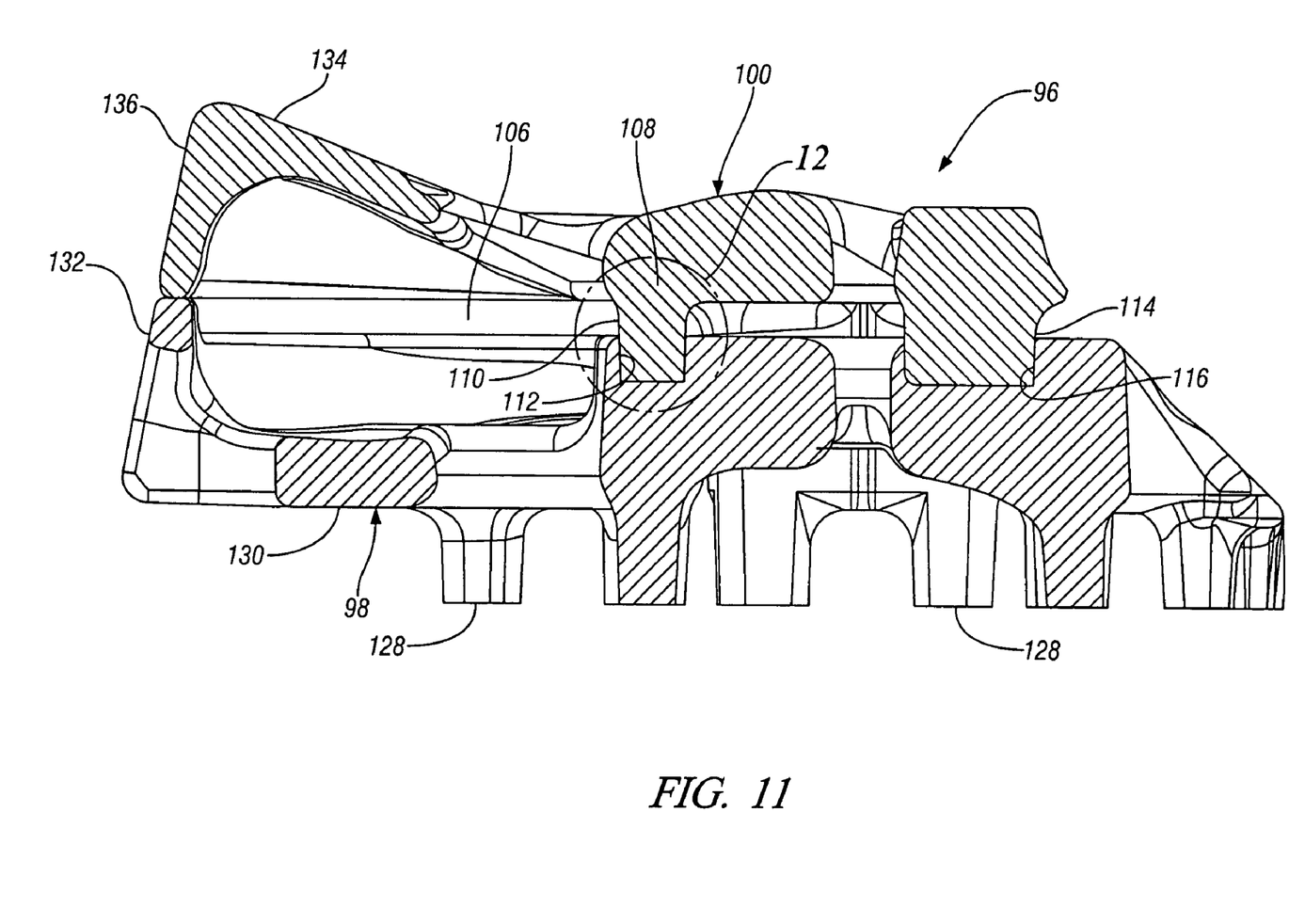
FIG. 11 is a cross-sectional view rearward from the line 11-11 of FIG. 8.
Figure 12:
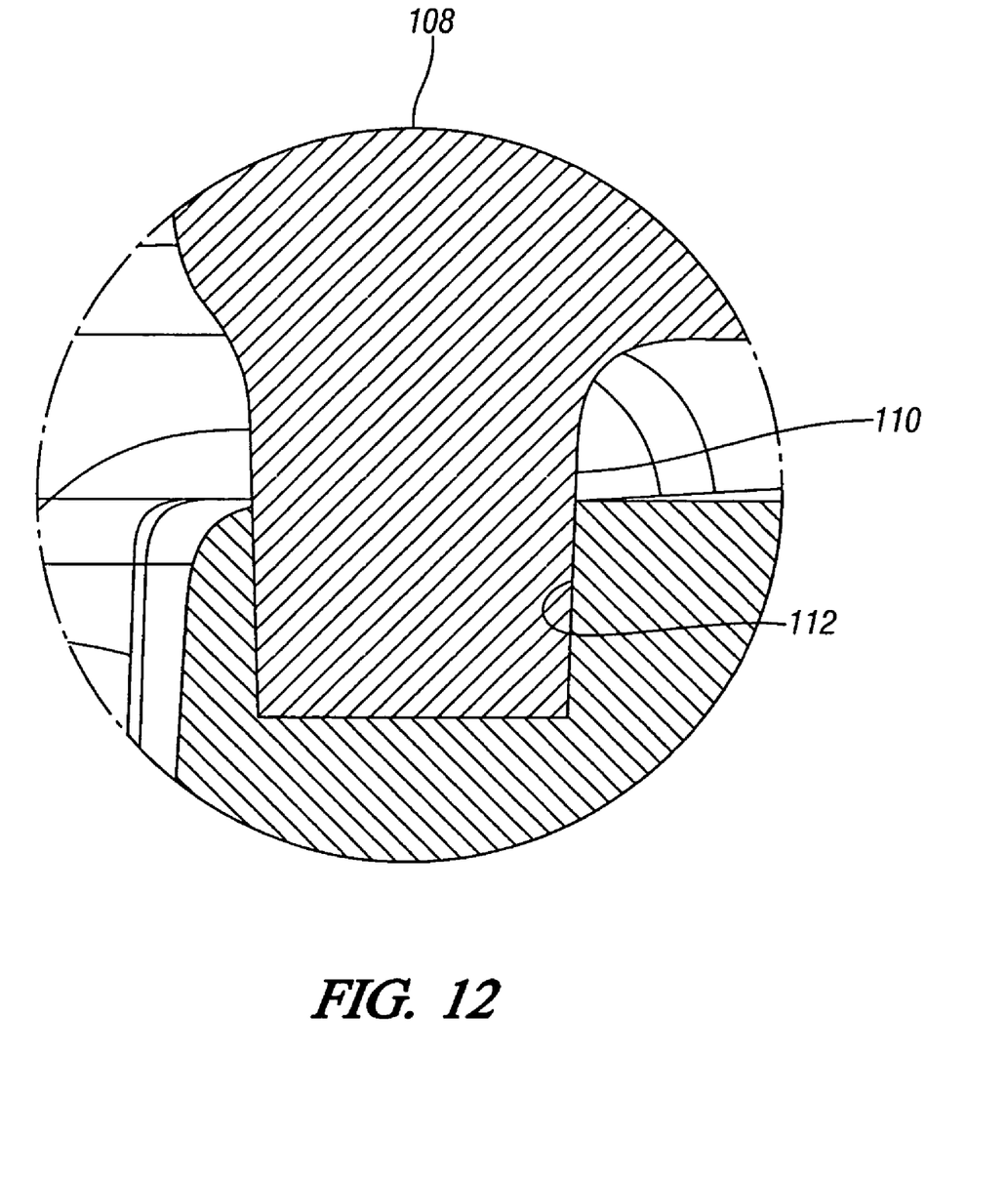
FIG. 12 is an enlarged view of the circled portion 12 of FIG. 11 illustrating one of the core print/flow restrictors.

As seen in FIGS. 7-11, the lower and upper cores 98, 100 include six core prints which hold the upper core away from the lower core, creating a space 106 that forms the dividing wall 64. These core prints also form restricted passages through the dividing wall at selected locations. These core prints include two outboard flow restrictor core prints 108 that form the flow restricted passages 78 spaced between the exhaust ports of adjacent combustion chambers. As shown in FIGS. 11 and 12, reduced diameter plugs 110 of the upper core received in mating sockets 112 of the lower core define orifices of the flow restricted passages 78. Similarly, slightly larger plugs 114 of the upper core received in mating sockets 116 of the lower core define orifices of the restricted flow passages 80 spaced between the intake ports of adjacent combustion chambers. Further, depending core prints 118 define outlet ports 84 connecting the upper coolant jacket 62 with the lower coolant jacket 60 of the water jacket 58 inside the front wall 28 of the cylinder head. The lower jacket 60 then directs coolant flow from the upper and lower jackets to a common outlet passage 90 formed by an angled extension 122 of the lower core 98.

The separate inlet passages 66 to the lower coolant jacket are formed by core prints 124 depending from the lower jacket core 98, while the inlet passages 68 to the upper coolant jacket are formed by core prints 126 depending from the upper jacket core 100 and passing between the core prints 124 of the lower jacket core. The core prints 124, 126 are sized to supply the desired coolant flow to the separate intakes of the lower and upper cooling jackets of the cylinder head. Additional core prints 128 depending from the lower core 98 conventionally space the water jacket core assembly 96 from a lower die, not shown, to form the bottom wall 36 of the cylinder head casting 26.

Referring back to FIG. 11, the lower core 98 includes horizontal portions 130 and vertical side portions 132, which form the horizontal and vertical cooling passages 71 and 74 along the lower side and lower mounting face of the exhaust outlet of the exhaust manifold 38. The upper core 100 includes upwardly slanting portions 134 and vertical side portions 136, which form the longitudinal and vertical cooling passages 72 and 76 along the upper side and the upper mounting face of the exhaust outlet of manifold 38.

Figure 13:
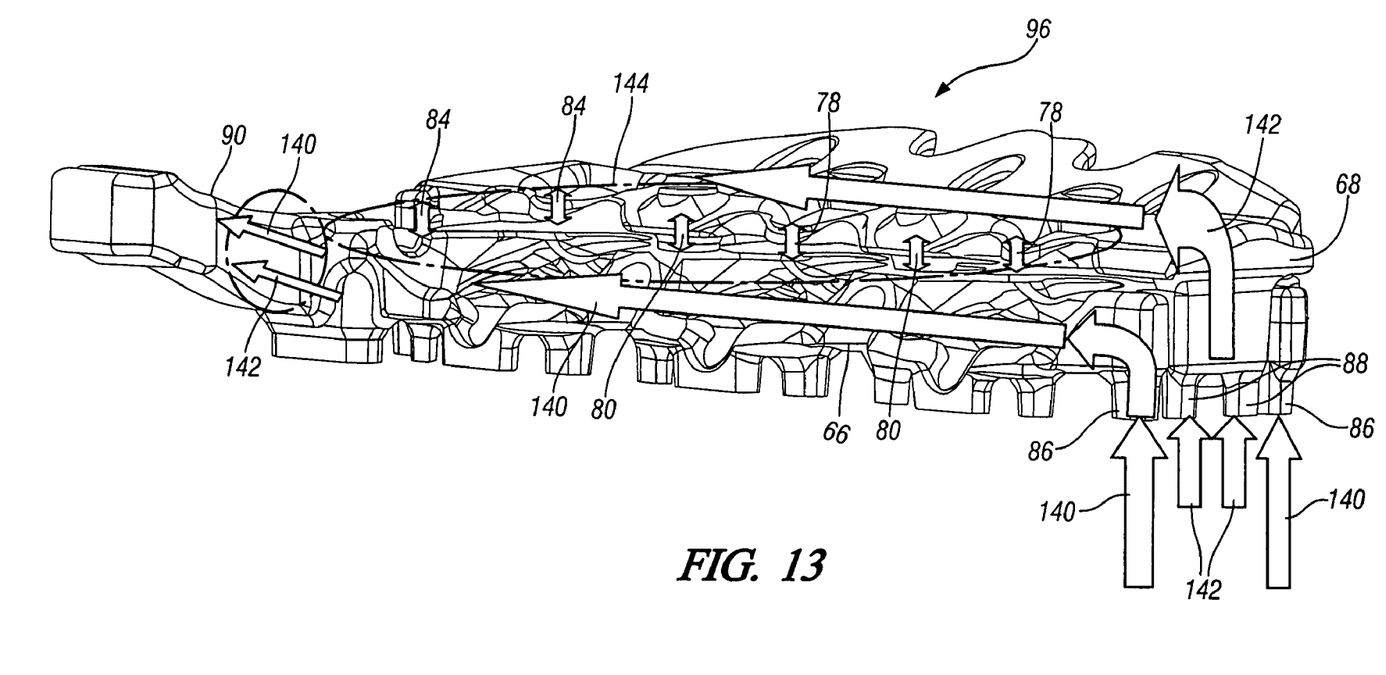
FIG. 13 is a view from the left rear along the intake valve side of the core assembly including arrows showing main coolant flow.
Figure 14:
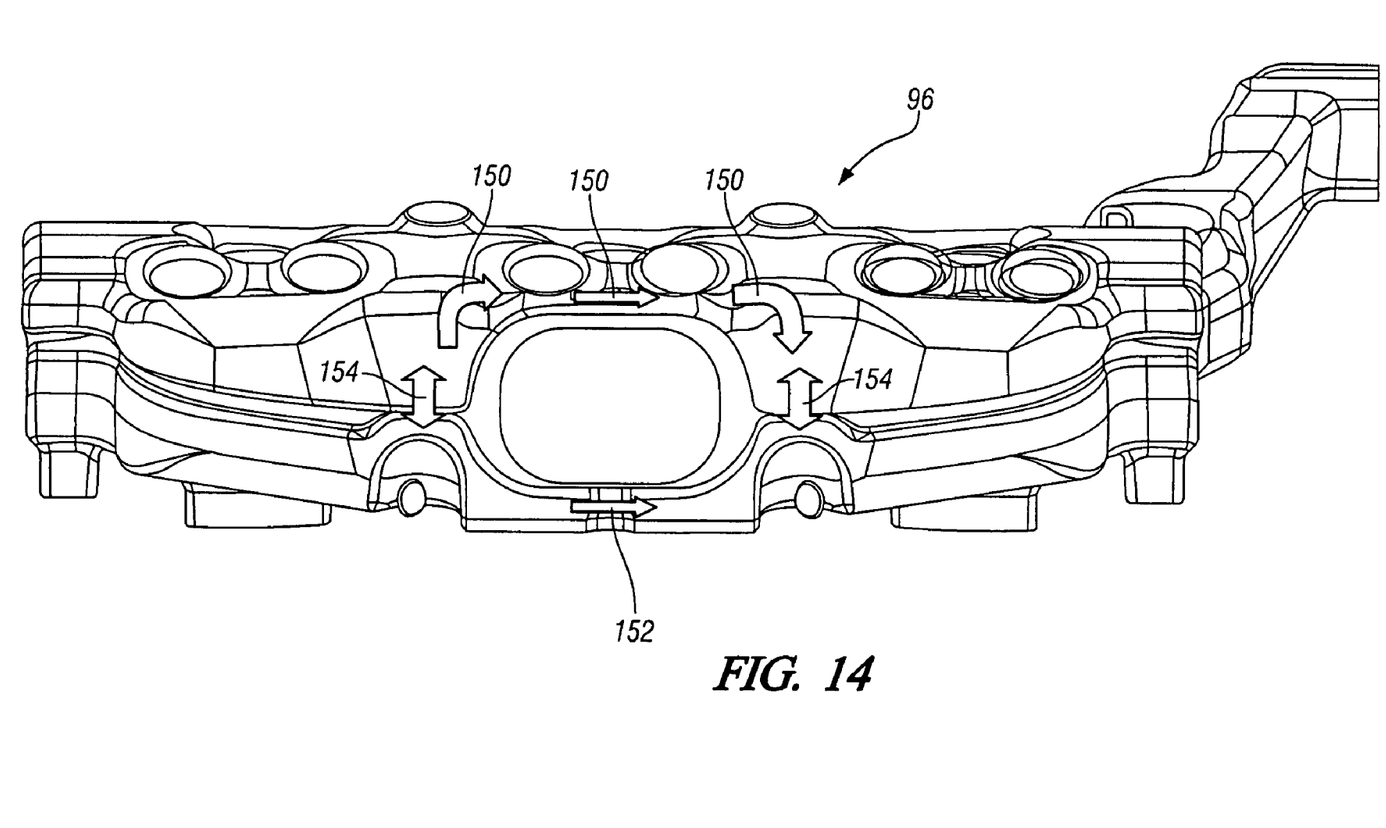
FIG. 14 is a view from the right (exhaust) side of the core assembly 96, looking downward behind the exhaust mounting face of the core assembly with flow indicating arrows.

FIGS. 13 and 14 are general views of the water jacket core assembly 96 to which shading and arrows have been added to show the manner of coolant flow through the passages formed by the core assembly in the cylinder head 12 made from the casting 26.

FIG. 13, viewed from the left rear along the intake valve side of the core assembly 96, shows the main coolant flow through the inlet passages 86 and longitudinally through the lower cooling passages 66 of the lower cooling jacket 60 and out through the common outlet passage 90, shown by light shaded arrows 140. Flow in the upper cooling jacket, through inlet passages 88, longitudinally through the upper cooling passages 68 and out through the common outlet passage 90, is shown by the darker shaded arrows 142. A light shaded area 144 and vertical arrows 146 show the locations of flow restrictor passages 78, 80 and 84 between the lower and upper cooling jackets 60, 62.

FIG. 14, viewed from the right (exhaust) side of the core assembly 96, looking downward behind the exhaust mounting face (not shown in the view) shows the space 106 that forms the dividing wall in the water jacket 58. Arrows 150 show the longitudinal front to rear coolant flow in the upper jacket 62 up and around the upper portion of the exhaust outlet 48. Arrow 152 shows the longitudinal front to rear coolant flow in the lower jacket 60 below the lower portion of the exhaust outlet. Arrows 154 show the locations behind the exhaust mounting face where the lower and upper cooling passages 66, 68 contact and allow coolant flow between these passages behind the mounting face, thereby improving cooling of the mounting face.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A cylinder head for a turbocharged engine comprising:
   a casting defining external and internal walls including front and rear end walls connected longitudinally by opposite side walls and a bottom wall engaging the end and side walls;
   an exhaust manifold within the casting and including first internal walls defining exhaust gas passages extending from individual exhaust ports in the lower wall to an exhaust gas outlet in one of the side walls, the outlet defined in a mounting face formed on said one side wall, and adapted for direct mounting of a turbocharger thereon;
   a water jacket for cooling the bottom wall and the exhaust manifold, the water jacket including a lower cooling jacket and an upper cooling jacket largely separated by a generally horizontal dividing wall forming generally longitudinal vertically separated coolant flow passages extending from one end of the cylinder head to an other end thereof, the lower cooling jacket being in heat exchange relation with the inside of said bottom (combustion chamber) wall and the lower side of the exhaust manifold in the cylinder head, and the upper cooling jacket being in heat exchange relation with the upper side of the exhaust manifold and an oil return chamber in the cylinder head above the water jacket;
   said lower and upper cooling jacket passages including generally vertical portions separated by said dividing wall but connecting with the longitudinal passages and lying inwardly adjacent the exhaust outlet mounting face to provide increased cooling of the mounting face.

2. The invention of claim 1 wherein said vertical portions are connected inwardly adjacent the mounting face, forming a continuous passage around the exhaust manifold outlet at the mounting face.

3. The invention of claim 1 including flow restricted vertical passages communicating the lower and upper cooling jackets between exhaust ports of adjacent engine combustion chambers to aid in cooling of the exhaust gas passages.

4. The invention of claim 3 including additional flow restricted vertical passages communicating the lower and upper cooling jackets between intake ports of adjacent engine combustion chambers.

5. The invention of claim 4 wherein the vertical passages extend beside adjacent combustion chambers of the cylinder head and aid in cooling interior walls of the combustion chambers.

6. The invention of claim 5 wherein the vertical passages between intake ports of the cylinders are larger than the vertical passages between the exhaust ports to provide increased cooling of the pressurized air charges in the intake ports.

7. The invention of claim 1 wherein the lower and upper cooling jackets have separate inlet passages at said one end of the cylinder head and sized to control the flow of coolant received from a common source and directed to the respective cooling jackets.

8. The invention of claim 7 wherein the upper and lower cooling jackets are connected to a common outlet passage at said other end of the cylinder head for returning the heated coolant from both jackets to an external cooling system for cooling and recirculation.

* * * * *